United States Patent [19]

Kassal et al.

[11] Patent Number: 4,902,747
[45] Date of Patent: Feb. 20, 1990

[54] POLYARYLATE MOLDING COMPOSITIONS

[75] Inventors: Robert J. Kassal, Wilmington; Pallatheri M. Subramanian, Hockessin, both of Del.

[73] Assignee: E. I. Du Pont de Nemours and Company, Wilmington, Del.

[21] Appl. No.: 132,489

[22] Filed: Dec. 14, 1987

[51] Int. Cl.$^4$ .............................................. C08L 67/02
[52] U.S. Cl. ...................................... 525/151; 525/68; 525/132; 525/166
[58] Field of Search .......................... 525/68, 132, 151

[56] References Cited

U.S. PATENT DOCUMENTS

| | | | |
|---|---|---|---|
| 3,005,795 | 10/1961 | Busse | 525/151 |
| 3,723,373 | 3/1973 | Lucas | 525/165 |
| 4,348,500 | 9/1982 | Robeson | 525/65 |

FOREIGN PATENT DOCUMENTS 81-042024 1/1975 Japan .
54-158453 12/1979 Japan .
59-174646 10/1984 Japan .

OTHER PUBLICATIONS

Throne, J. L., Plastics Process Engineering, p. 673, Marcel Dekker, Inc., N.Y., 1979.

Primary Examiner—Patricia Short

[57] ABSTRACT

In the instant invention, improved blow moldable polyarylate compositions which yield molded objects having substantially uniform wall thickness throughout are provided by the addition of a small amount of a fibrillatable fluoropolymer resin.

4 Claims, 1 Drawing Sheet

F I G. 1A     F I G. 1B
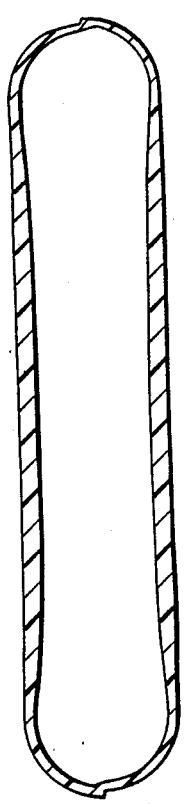   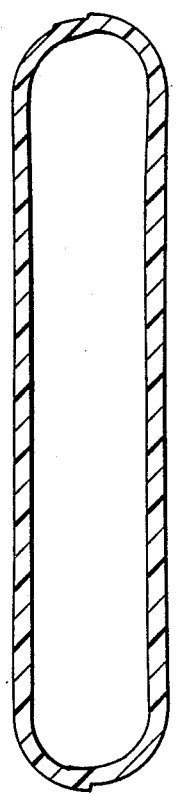

POLYARYLATE MOLDING COMPOSITIONS

BACKGROUND OF THE INVENTION

Commercial aromatic polyesters, hereinafter "polyarylates", are derived from bisphenols, typically bisphenol A, and aromatic dicarboxylic acids, typically isophthalic acid which may be admixed with up to 80% of terephthalic acid. Commercial polyarylates are rigid, amorphous polymers which exhibit high heat distortion temperatures. These properties are advantageous in many applications including automobile parts for under-the-hood use and double-walled housings for appliances. There are many components of automobiles and other systems which are hollow and are most readily manufactured by blow molding. In contrast to commercial grades of polyester resins, such as poly(ethylene terephthalate), there are some commercial grades of polyarylates that can be blow molded. Because of the amorphous character of the polyarylates and the limited sensitivity of their viscosity to temperature changes, they have what might be called a relatively wide "temperature-window" where processing by blow molding is practical. Ordinary polyesters; e.g., ones made from aliphatic alcohols, have virtually no temperature-window for blow molding because of the low viscosity of their melts coupled with the fact that crystallization is encountered before lowering of the temperature raises their viscosity sufficiently for blow molding.

For applications where the high maximum heat distortion temperature property of polyarylates is not of importance, it is advantageous, particularly from a cost standpoint, to admix a lower-cost polyester resin with a polyarylate. Such blends retain the blow moldable characteristic of the polyarylates when blending of the melt of the two polymers is continued for a sufficient period of time such that the resulting blend is amorphous. If blending is conducted for only a short period of time, portions of the resulting blend will crystallize and interfere with attempts to blow mold the product.

It has been found that the addition of small amounts of ethylene copolymers containing epoxy groups to polyarylates or amorphous blends of polyarylates with polyesters increases their melt viscosity. This effect widens the temperature-window for processing by blow molding. While the polyarylate compositions modified with the epoxy-containing copolymers are readily blow molded even into articles having complex cross-sections, it has been found that the wall thickness of objects having complex cross-sections may vary by more than 100% when the thickest portions of the article are compared to the thinnest portions of the article. This irregularity in wall thickness is a serious drawback to the use of polyarylates because the only way to obtain a predetermined minimum wall thickness throughout an entire blow molded article is to increase the amount of polyarylate used to make the molding. This solution to the problem is costly in terms of material, weight and processing time. Thus, there is still a need for improved polyarylate-based blow molding compositions capable of providing complex moldings having uniform wall thickness throughout. Such compositions would provide blow molded objects having maximum strength for minimum weight and cost.

SUMMARY OF THE INVENTION

In the instant invention, improved blow moldable polyarylate compositions which yield molded objects having substantially uniform wall thickness throughout are provided by the addition of a small amount of a fibrillatable fluoropolymer resin.

The compositions are a melt blend of a mixture consisting essentially of (a) 50–100 parts of a polyarylate derived from at least one dihydric phenol and at least one aromatic dicarboxylic acid;

(b) 0–50 parts of a polyester derived from at least one aliphatic and/or cycloaliphatic diol and at least one dicarboxylic acid;

(c) 1–15 parts of a copolymer containing epoxy groups; and (d) 0.1–3.0% of a fibrillatable fluoropolymer resin.

These compositions are readily processible by blow molding to make hollow parts such as automobile parts. Because of the uniform wall thickness of the resulting moldings, maximum strength is obtained for a given amount of polymer composition.

FIGURES

FIG. 1 is a reproduction of cross-sections cut from two blow molded hollow panels. The reproduction was made using an electrostatic copier. The same mold and molding machine were used to prepare the hollow panels. Cross-section (A) was taken from a molding made from a polyarylate composition which had been modified by the addition of a small amount of ethylene copolymer containing epoxy groups. Cross-section (B) was taken from a molding made from a polyarylate composition representative of the compositions of the instant invention. A detailed description of the molding compositions and molding procedures used to prepare the panels corresponding to cross-sections (A) and (B) of FIG. 1 is provided hereinafter in the Examples.

DETAILED DESCRIPTION OF THE INVENTION

The polyarylates used as component (a) in the compositions of the invention are aromatic polyesters derived from one or more dihydric phenols and one or more aromatic dicarboxylic acids. The dihydric phenol can be a bisphenol as described in U.S. Pat. No. 4,187,358 having the structure:

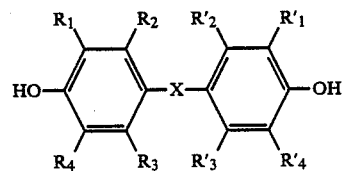

wherein —X— is selected from the group consisting of nothing; i.e., a covalent bond, —O—, —S—, —SO$_2$—, —SO—, —CO—, an alkylene group containing 1 to 5 carbon atoms and an alkylidene group containing 2 to 7 carbon atoms, and $R_1$, $R_2$, $R_3$, $R_4$, $R_1'$, $R_2'$, $R_3'$, and $R_4'$, may be the same or different, and each is selected from the group consisting of a hydrogen atom, a chlorine atom, a bromine atom and an alkyl group containing 1 to 5 carbon atoms, and/or a functional derivative thereof.

Additionally, up to 40 mole % of mononuclear dihydric phenols may be used in combination with the bisphenols. Representative are hydroquinone and resorcinol and substituted derivatives thereof containing one to four substituents selected from the group consisting of chlorine, bromine and lower alkyl.

Preferably, a mixture of 90 to 0 mole % of terephthalic acid and/or the functional derivatives thereof and 10 to 100 mole % of isophthalic acid and/or its functional derivatives is used as the acid component to be reacted with the bisphenol to prepare the polyarylate used in the compositions of the present invention. More preferably, a mixture of 0 to 30 mole % of terephthalic acid and/or the functional derivatives thereof and 100 to 70 mole % of isophthalic acid and/or the functional derivatives thereof is used. Polyarylate prepared from a bisphenol as described above and a mixture of 10–0 mole % of terephthalic acid and/or the functional derivatives thereof and 90–100 mole % of isophthalic acid and/or the functional derivatives thereof is most preferred. The molar ratio of the bisphenol to the sum of the terephthalic acid units and isophthalic acid units is substantially equimolar. Aromatic hydroxy acids such as hydroxy benzoic or hydroxy naphthoic acid and other dicarboxylic acids (both aromatic and aliphatic) can also be incorporated into the polyarylate structure as a minor component.

Examples of functional derivatives of terephthalic or isophthalic acid which can be used in this invention include acid halides and diaryl esters. Preferred examples of acid halides include terephthaloyl dichloride, isophthaloyl dichloride, terephthaloyl dibromide and isophthaloyl dibromide. Prefered examples of diaryl esters include diphenyl terephthalate and diphenyl isophthalate.

Examples of suitable bisphenols are 4,4'-dihydroxydiphenyl ether, bis(4-hydroxy-2-methylphenyl) ether, bis(4-hydroxy-3-chlorophenyl)-ether, bis(4-hydroxyphenyl)sulfide, bis(4-hydroxy-phenyl)sulfone, bis(4-hydroxyphenyl)ketone, bis(4-hydroxyphenyl)methane, bis(4-hydroxy-3-methyl-phenyl)methane, bis(4-hydroxy-3,5-dichlorophenyl)-methane, 1,1-bis(4-hydroxyphenyl)cyclohexane, 1,1-bis(4-hydroxyphenyl)cyclopentane, 1,1-bis(4-hydroxyphenyl)cycloheptane, bis(4-hydroxy-3,5-dibromophenyl)methane, 1,1-bis(4-hydroxyphenyl)-ethane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy3,5-dibromophenyl)-propane, 3,3,3',3'-tetramethyl spirobis-1,1'-indane-6,6'-diol and 1,1-bis(4-hydroxyphenyl)-n-butane. 2,2-Bis(4-hydroxyphenyl)propane is most preferred.

Typical examples of the functional derivatives of the bisphenol which can be used are the alkali metal salts and diesters with aliphatic monocarboxylic acids containing 1 to 3 carbon atoms. Suitable examples of aliphatic monocarboxylic acids include formic acid, acetic acid, propionic acid, etc. Preferred functional derivatives of the bisphenols are the sodium salts, the potassium salts, and the diacetate esters.

Polyarylates useful in the compositions of the present invention can be prepared by any of several known methods. The interfacial polymerization method comprises mixing a solution of an aromatic dicarboxylic acid chloride in a water-immiscible organic solvent with an alkaline aqueous solution of bisphenol. The solution polymerization method comprises heating bisphenol and a diacid dichloride in an organic solvent. One melt polymerization method comprises heating a diphenyl ester of an aromatic dicarboxylic acid and bisphenol. An alternate melt polymerization method comprises heating aromatic dicarboxylic acid and a diester (e.g., the diacetate ester) of bisphenol. These methods are described in detail in U.S. Pat. Nos. 3,884,990, 3,946,091, 4,052,481 and 4,485,230.

In order to insure good physical properties in the compositions of the present invention, the polyarylate should have a logarithmic viscosity number (inh or IV), defined by the following equation of about 0.35 to about 1.5, preferably 0.40 to 0.65

$$\eta inh = \frac{\ln t_1/t2}{C}$$

wherein $t_1$ is the falling time (in seconds) of a solution of the polyarylate, $t_2$ is the falling time (in seconds) of the solvent; and C is the concentration (g/dl) of the polyarylate in the solution. The logarithimic viscosity number used herein is determined in a trifluoroacetic acid-methylene chloride mixture (25/75 by volume) at 30° C. The procedure is further described in Textbook of Polymer Science by F. Billmeyer, p. 79 (John Wiley & Sons, 1962).

The polyester resins useful as component (b) are well known in the art. The polyester resins are usually prepared by melt condensation of one or more dicarboxylic acids or ester-forming derivatives thereof with one or more glycols. Usually the glycol is employed in a stoichometric excess relative to the diacid.

Among the dicarboxylic acids suitable for preparing polyesters in accordance with the present invention are the aromatic dicarboxylic acids such as terephthalic acid, isophthalic acid, orthophthalic acid, 2,6-naphthalene dicarboxylic acid, 1,5-naphthalene dicarboxylic acid, bis(p-carboxyphenyl)methane, anthracene dicarboxylic acid, 4,4'-diphenylether dicarboxylic acid; aliphatic dicarboxylic acids such as adipic acid; cycloaliphatic dicarboxylic acids such as 1,4-cyclohexane dicarboxylic acid and the like; or ester forming derivatives thereof.

The glycols suitable for preparing polyesters in accordance with the present invention include aliphatic and cycloaliphatic diols having 2 to 10 carbon atoms such as ethylene glycol, 1,3-propylene glycol, 1,4-butanediol, neopentyl glycol, 1,5-pentanediol, 1.6-hexanediol, decamethylene glycol, cyclohexanediol, and 1,4-cyclohexanedimethanol.

Poly(ethylene terephthalate) is especially preferred for use as component (b). Also preferred are polyesters derived from 1,4-cyclohexanedimethanol(usually a mixture of cis- and trans-isomers) and terephthalic acid optionally admixed with isophthalic acid and polyesters derived from a mixture of cyclohexanedimethanol and ethylene glycol with terephthalic acid.

The polyesters used herein have an intrinsic viscosity of from about 0.2 to about 2.0 dl/g as measured in a 60–40 phenol/tetrachloroethane mixture or similar solvent at 23°–30° C.

As indicated hereinbefore, the use of component (b) is optional in the compositions of the instant invention. For end uses which do not require the maximum heat distortion temperatures provided by polyarylates, the incorporation of up to 50 parts by weight of polyester resin per 100 parts by weight of components (a) and (b) may be advantageous from an economic standpoint. The addition of component (b) in the maximum amounts contemplated does not diminish the processibility by blow molding of the compositions of this invention, provided that components (a) and (b) are intermixed in the melt until the resulting blend is amorphous.

The epoxide group-containing copolymers which serve as component (c) contain recurring units of the monomers:

(1) $CH_2=C(R)COOCH_2\overline{CHCH_2O}$ wherein R=H or alkyl of 1-6 carbon atoms.

The copolymer will also contain one or more of the following (2) $CH_2=CHR$ where R=H, lower alkyl or phenyl
(3) $CH_2=C(R_1)COOR^2$ where $R_1$=H, lower alkyl and $R^2$=alkyl of 1-8 carbons
(4) $RCOOCH=CH_2$ where R=lower alkyl
(5) CO (carbon monoxide); and include polymers derived from monomers of class (1) with monomers of class (2) either alone or in admixture with monomers of classes (3), (4) and/or (5); and polymers derived from monomers of class (1) with monomers of class (3) either alone or in admixture with monomers of class (4).

Thus, the polymers may be dipolymers derived from one or more monomers of classes (1) and (2) of which ethylene/glycidyl methacrylate copolymers are representative. More preferred are terpolymers containing one or more monomers selected from classes (3), (4) or (5) in addition to monomers from classes (1) and (2). Examples of these terpolymers include polymers of ethylene/vinyl acetate/glycidyl methacrylate and ethylene/alkyl (meth)acrylate/glycidyl methacrylate.

The epoxide group-containing polymers may also be derived from one or more monomers of classes (1) and (3) of which methyl acrylate/butyl acrylate/glycidyl methacrylate polymers are representative. These polymers may also contain units derived from monomers of class (4), illustrative of which is methyl methacrylate/vinyl acetate/glycidyl methacrylate terpolymer.

The concentration of monomers of class (1), the glycidyl esters, may vary from about 0.5-15% by weight, preferably 1-7% by weight, in the epoxide group-containing polymers described hereinbefore.

Olefin polymers derived from monomer classes (1) and (2) and further containing up to about 40% by weight of units derived from one or more monomers of classes (3), (4) and (5) are preferred. Especially preferred are terpolymers of ethylene containing 10-30% by weight butyl acrylate and 1-7% by weight glycidyl methacrylate.

Component (c), the epoxy-containing polymer can be used in amounts of 1-15 parts per 100 parts of components (a) and (b). Amounts between 5 and 12 parts are preferred because they significantly increase the temperature window for good blow molding without seriously reducing the rigidity of the molded articles.

Component (d), the fibrillatable fluoropolymer resin is preferably a non-melt-fabricable tetrafluoroethylene polymer. The tetrafluoroethylene polymers are made by an emulsion polymerization process, in which the polymer particles formed remain dispersed in the reaction mix after the polymerization. The particles may be coagulated and dried. The particles fibrillate while being physically mixed into the compositions of the invention.

The fibrillatable PTFE is a well known material in the art and readily available as a commercial product. The commercially available fibrillatable PTFE is in the form of an aqueous dispersion resulting from emulsion polymerization or in the form of a powder obtained by separation of the resin from the aqueous dispersion followed by drying. The aqueous dispersion of the fibrillatable PTFE contains usually several tens of %, say, up to 60% of the PTFE particles having a diameter of about 0.2 micrometers while the powdery products are agglomerates of these particles having a diameter of about 0.5 mm. The PTFE particles of either form are readily converted into fibrils when the particles are subjected to the mechanical shearing forces required to intermix the other components of the instant compositions.

Several examples of commercially available fibrillatable PTFE are as follows: Teflon 6J (a product by Mitsui Fluorochemical Co.), Teflon 6JC (a product by the same company), Polyflon F-103 (a product of Daikin Kogyo Co.) and Polyflon F-201 (a product by the same company) are examples of powdery products and Teflon 30-J (a product by Mitsui Fluorochemical Co.) and Polyflons D-1 and D-2 (products by Daikin Kogyo Co.) are examples of aqueous dispersion products.

Component (d), the fibrillatable fluoropolymer resin, is used in the instant compositions in amounts of 0.1-3.0 parts per 100 parts of components (a) and (b). Amounts between 0.3 and 1.0 parts are preferred. The preferred amounts generally provide moldings exhibiting a high degree of uniformity of wall thickness. Depending on the particular molding composition being used and the complexity of the blow molded article to be produced, greater or lesser amounts of fluoropolymer resin may be required.

The ingredients used to make the compositions of the invention may be combined by tumble blending of the components and fed directly to the extruder of the blow molding equipment. It is preferable, however, that the components be dispersed uniformly in a separate step prior to a blow molding operation. Melt blending of the ingredients, by using equipment such as a melt extruder (e.g. single screw extruders or preferably twin screw extruders) is effective. The blended product is pelletized (i.e., the extruded strand is quenched and cut), dried and used for subsequent blow molding purposes using an extrusion blow molding machine (e.g., made by Rocheleau Inc., Hayssen Inc., etc.) and fabricated into hollow articles. An especially preferred method of preparing the instant compositions, particularly when a polyester resin is used, involves mixing in a twin screw extruder and feeding the molten extrudate directly to a static mixer (e.g. a Koch mixer). Passage through the twin screw extruder provides excellent physical dispersion of the components and the static mixer provides additional time for the chemical interaction of the components. The melt exiting the second extruder is quenched, pelletized and dried and is then ready for use in blow molding applications.

Other additives as are known to those familiar with polymer compounding may be included in the compositions. These additives include stabilizers, antioxidants, flame retardants, reinforcing agents such as glass fiber and flake, mineral fillers, ultraviolet light stabilizers, etc. When reinforcing agents or mineral fillers are to be introduced, it is preferable to first mix them with the polyarylate resin which has a relatively low melt viscosity compared to that of the melt blends of this invention. Minor amounts of other polymers which are mechanically compatible with polyesters can also be incorporated in the present compositions. Examples of such polymers include polycarbonates and poly(arylethers).

EXAMPLES (A) Control

The following ingredients are placed in a polyethylene bag which is tumbled to provide a dry blend.

72.49 parts of a polyarylate made from 2,2'-bis(4-hydroxyphenyl)propane and isophthalic acid via the diacetate of the bis-phenol; inherent viscosity, 0.58 g/dl 27.50 parts of poly(ethylene terephthalate); inherent viscosity, nominal 0.67.

8.11 parts of a terpolymer of ethylene/27% n-butyl acrylate/3.2% glycidyl methacrylate 0.108 parts 1,3,5-trimethyl-2,4,6-tris(3,5-ditertiary-butyl-4-hydroxybenzyl)benzene The resulting dry blend is melt blended on a Werner and Pfleiderer twin screw extruder having a diameter of 28 mm and a length to diameter ratio of 27.5. The screw used is a general purpose screw with vacuum capability consisting of conveying elements to convey the feed material from the feed zone to a melting zone in which the material is compressed and melting begins. A section of "kneading blocks" followed by "reverse elements" next provides high shear and pressure to further the melting and mixing processes. The reverse elements serve also to provide a melt seal following which the melt is decompressed in the section under vacuum. Following the vacuum zone, the screw recompresses the melt and passes it through kneading blocks and reverse elements which also serve as a vacuum seal for this side of the vacuum zone. The melt is then further compressed and mixed as it passes through the end of the extruder and out the die. The extruder barrel and die are set at a temperature of 290° C. The extrudate exiting from the twin screw extruder is fed directly to a Koch mixer (a tubular static mixer with fixed baffles having a diameter of 38.1 mm and a length of 23 cm). The Koch mixer is maintained at a temperature of 290° C. The material extruded from the Koch mixer is pelletized and dried.

The dried resin is blow molded using a Hayssen blow molding machine equipped with a single screw extruder. The screw has a 50.8 mm diameter, a length to diameter ratio of 22 and a compression ratio of 3 to 1. The resin is blow molded under the following conditions:

| Extruder barrel, | zone 1, | feed zone | 271° C. |
|---|---|---|---|
| | zone 2, | transition zone | 292° C. |
| | zone 3, | metering zone | 286° C. |
| | zone 4, | accumulator | 286° C. |
| | zone 5, | accumulator | 281° C. |
| | zone 6, | die tip | 282° C. |
| Mold temperature, | | | 27° C. |

The resin is extruded at a screw speed of 33 RPM into the accumulator. Once the accumulator is filled, the parison is ejected from the accumulator with a drop time of 2.8 seconds. The resin melt exhibits good melt strength as evidenced by the appearance of the parison which is round and shows no signs of sagging, wrinkling or draping. Upon closing the mold, the part is blown with air at 60 psi. The blown part is cooled in the mold under pressure and ejected after a total cycle time of 59 seconds. The test mold yields a hollow rigid panel panel measuring 10½"×4½"×1" with flat surfaces and rounded edges.

In order to permit examination of the wall thickness of the panel, the panel is sawn across the 4½" dimension about ¾" from the edge of the panel opposite the point of inflation. The wall thickness varies from about 3.3 mm to 1.6 mm, corresponding to a variation of 106% of the thickest portions of the wall relative to the thinnest portions of the wall. By placing the cut surface of the portion of the panel removed by sawing on the glass screen of an electrostatic copying machine, the reproduction of the cut surface of the control shown in FIG. 1 as cross-section (A) is obtained.

(B) Example

The procedure of the Control (A) is substantially repeated with the exception that 0.538 parts of a poly(tetrafluoroethylene) resin is added as an additional ingredient. Mixing and molding are performed as described for Control (A). A section of the resulting panel is sawn off in the manner described for Control (A). The wall thickness of this cross-section varies from about 3.1 mm to 2.8 mm corresponding to a variation in wall thickness of about 11%. The reproduction of cross-section (B) is obtained in the manner described for cross-section (A).

The comparison of the physical properties of Control (A) and Example (B) provided in the following Table demonstrates that the addition of the poly(tetrafluoroethylene) resin has no adverse effect.

TABLE

| Property | Control (A) | Example (B) |
|---|---|---|
| Notched Izod, 25° C., ft/lb/in | 10.7 | 10.0 |
| Heat distortion temp. @264 psi, °C. | 110.7 | 110.2 |
| Tensile strength, 25° C. Kpsi | 9.5 | 9.5 |
| Elongation at break, % | 25 | 41 |
| Flexural modulus, Kpsi | 310 | 313 |

What is claimed:

1. A melt blend of a mixture consisting essentially of
   (a) 50–100 parts of a polyarylate derived from at least one dihydric phenol and at least one aromatic dicarboxylic acid;
   (b) 0–50 parts of a polyester derived from at least one aliphatic and/or cycloaliphatic diol and at least one dicarboxylic acid;
   (c) 1–15 parts of an epoxy group containing copolymer consisting of recurring units of the monomer (1) $CH_2=C(R)COOCH_2CHCH_2O$ wherein R=H or alkyl of 1–6 carbon atoms, and recurring units of at least one monomer selected from the group consisting of (2) $CH_2=CHR$ where R=H, lower alkyl or phenyl, (3) $CH_2=C(R_1)COOR_2$ where $R_1$=H, lower alkyl and $R_2$=alkyl of 1–8 carbons, (4) $RCOOCH=CH_2$ where R= lower alkyl, and (5) CO; and
   (d) 0.1–3.0% of a fibrillatable fluoropolymer resin.

2. The blend of claim 1 wherein in component (a) the dihydric phenol is a bisphenol and the aromatic dicarboxylic acid is isophthalic acid or mixtures therewith of terephthalic acid.

3. The blend of claim 1 wherein component (C)(2) is ethylene.

4. The lend of claim 2 wherein component (C)(2) is ethylene.

* * * * *

UNITED STATES PATENT AND TRADEMARK OFFICE
CERTIFICATE OF CORRECTION

PATENT NO. : 4,902,747

DATED : February 20, 1990

INVENTOR(S) : Robert J. Kassal; Pallatheri M. Subramanian

It is certified that error appears in the above-identified patent and that said Letters Patent is hereby corrected as shown below:

In the Claims:
Claim 4:
Col. 8, line 63, delete "lend" and insert in place thereof --blend--.

Signed and Sealed this

Fourth Day of December, 1990

Attest:

HARRY F. MANBECK, JR.

Attesting Officer    Commissioner of Patents and Trademarks